United States Patent Office 3,448,967
Patented June 10, 1969

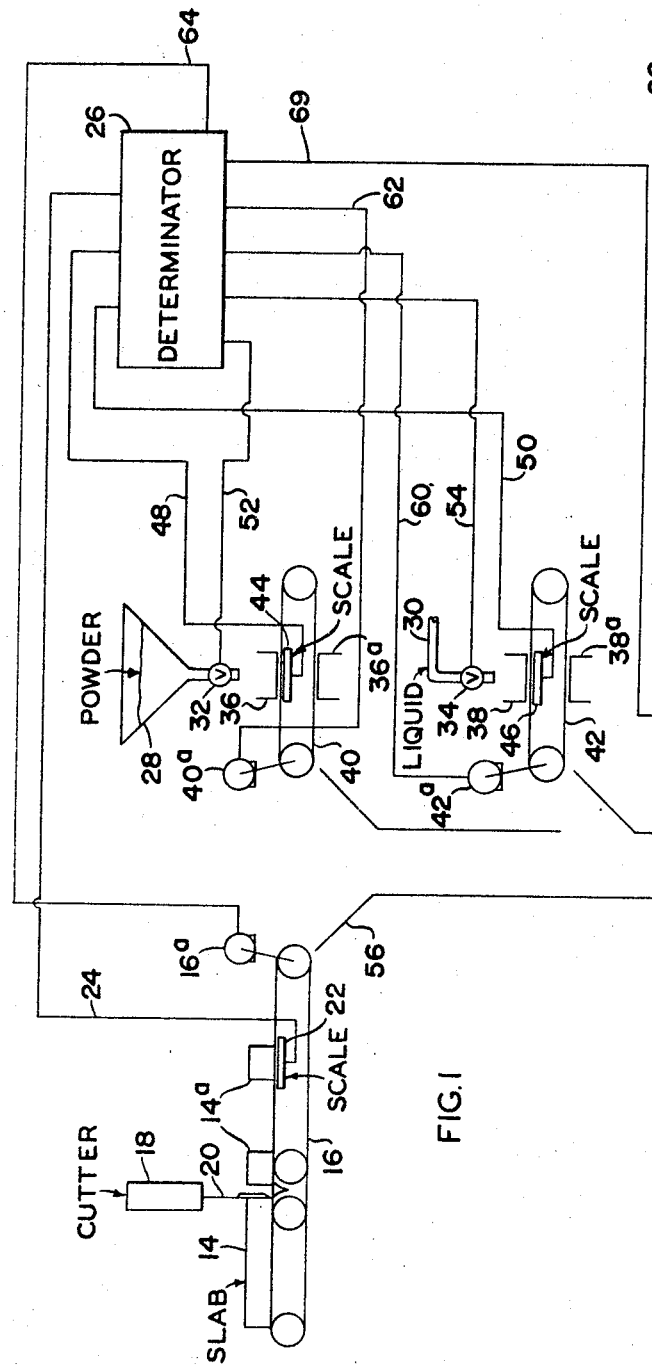
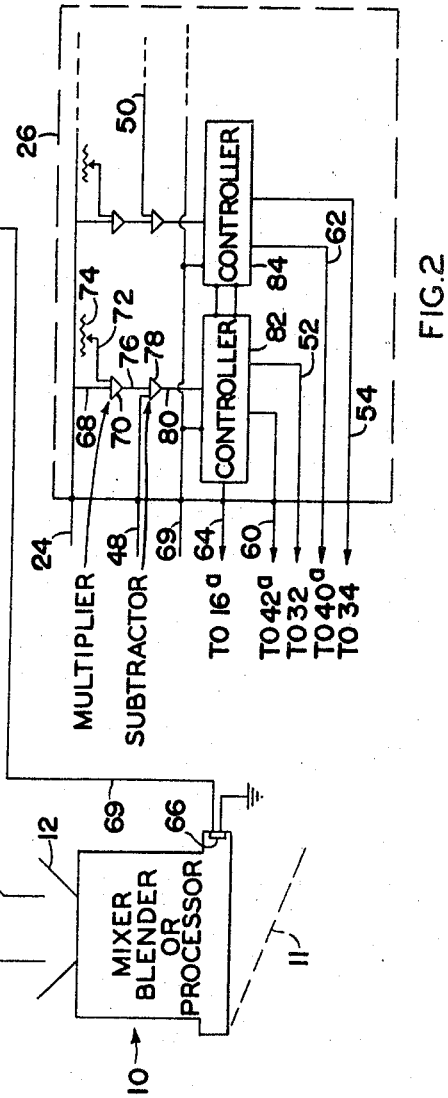
INVENTORS
REX C. SEANOR
S. EVERETT PERLBERG
BY
Oldham & Oldham
ATTORNEYS.

3,448,967
APPARATUS FOR AUTOMATICALLY MEASURING PROPER ADDITIVE QUANTITIES IN A MIXING APPARATUS
Rex C. Seanor, Akron, Ohio, and S. Everett Perlberg, Fairlawn, N.J., assignors to Adamson United Company, Akron, Ohio
Filed Aug. 16, 1967, Ser. No. 661,048
Int. Cl. B28c 7/04; B67d 5/08, 5/14
U.S. Cl. 259—154
9 Claims

ABSTRACT OF THE DISCLOSURE

Apparatus for automatically weighing an elastomer mass and for providing and weighing the compounding ingredients for mixture therewith. Controls shut off the feed of the compounding ingredients in proper proportion for mixture with the weighed elastomer mass and prepare such elastomer mass and compounding ingredients for discharge into a mixer, blender, or other processing means.

---

This invention relates to apparatus for mixing, blending and compounding various natural and synthetic rubber and plastic materials, and, more particularly, to an apparatus which automatically determines the precise amounts of solid and liquid additives which are to be added to the mixing compound in response to indications of the weight of the basic elastomer being processed.

It has long been recognized that proper mixing and compounding of elastomers is best achieved when precise ratios are observed between the amounts of materials which are added to the mixing batch. For example, it is quite important to a proper mixing operation that the weight of the pre-mix slab of rubber, or the like, and the weight of mix additives, such as powders, fillers, oils and vulcanizing agents are in a definite weight ratio to each other. Heretofore, this has been accomplished in some instances by manually cutting small slivers of elastomer or small manually added quantities of materials and then weighing them until the sample is in proper weight ratio with the weight of the powder or other additives, which usually are of a specified weight. This practice, although necessary to insure proper weight ratio between the elastomer and the additives, has not always proven accurate, nor sufficiently fast when short cycles mixes are contemplated.

It is the general object of the present invention to overcome these and other prior art difficulties by providing apparatus which weighs the elastomer and, is responsive thereto, automatically adds to the mix only the amount of additives which should be mixed therewith in order to establish the proper weight ratio. This is achieved by utilizing means for accurately determining the weight of the elastomer, and by providing determinator means which are responsive to the indicated weight, which determinator means automatically and selectively, in accordance with the weight indications, controls the amount of additives which are prepared for mixture with the elastomer, or mass of material being processed.

A better understanding of the apparatus of the invention can be had by referring to the following drawings wherein:

FIG. 1 is a diagrammatic side elevation of typical apparatus utilized to provide proper mixing, or blending of the elastomer and additives; and FIG. 2 is a schematic illustration of the wiring diagram of the determinator utilized in the apparatus of the invention.

In the invention, and with particular reference to FIG. 1, the numeral 10 generally indicates one type of standard mixer or blender having a mixing chamber into which the various elastomers and additives are fed in order to form the desired compound. The mixer 10 has a trough 12 which is adapted to receive the various mix additives and channel them into the mixing chamber of the mixer 10. In this instance, a slab or mass 14 of elastomer to be processed is shown and is adapted to be fed toward the mixer 10 by means of a transport system, or conveyor, indicated generally by the numeral 16. Since, however, the entire mass 14 of elastomer, which may or may not have been premixed with other materials, as desired, is fed into the mixer or blender 10 at one or more times through separate transporting means. A suitable weight control means such as a cutter unit 18 or trimmer control is provided and is adapted to be actuated so that a portion of the elastomer is selected. These individual portions 14a are adapted to be fed into the mixer 10, a suitable scale 22 is positioned along the transport or conveyor system 16. An electric pickoff lead 24, suitably connected to the scale 22, is part of a power circuit so that it is adapted to relay an electronic signal indicating the weight of the elastomer to a determinator system, which is generally indicated by the numeral 26. Other feeder means may be provided to deposit a quantity of elastomer in powder, pellet or other form onto the transporter 16 or into containers thereon.

As mentioned previously, in order to form a proper mixing compound, it is desirable to get the proper ratio between the weight of the elastomer and the weight of the powder, liquid, or other additives which are to be mixed therewith in the mixing chamber of the mixer 10. In order to accomplish such proper mixing, the apparatus of the invention utilizes, for example, a suitable powder additives supply source 28 and a liquid additive supply source 30, and valves 32 and 34 controlling the flow of the powder and liquid additives from the sources 28 and 30, respectively, and which may be operated electrically, or otherwise, as desired.

The powder and liquid additives flow from their respective supply sources 28 and 30 when the valves 32 and 34 are open into receiving hoppers 36 and 38 which are positioned on transporter or conveyor systems 40 and 42, respectively. As the additives flow into the respective hoppers 36 and 38, suitable scale means 44 and 46 are adapted to determine the weight accurately of the additives in the hoppers 36 and 38, and electric pickoff leads 48 and 50 feed this information as an electrical signal into the determinator means 26.

The determinator means, by digesting, analyzing, and comparing the information relayed to it by the lead 24 from the scale 22, and leads 48 and 50 from the scales 44 and 46, is able to determine the precise points at which the weights of the additives flowing into the hoppers 36 and 38 reach a proper ratio with the weight of the provided batch, or premix material, or elastomer portion 14a. When this precise point is reached, the determinator means, through the leads 52 and 54 will actuate electronic control valves 32 and 34 to stop the flow of the powder and liquid additives from their respective supply sources into hoppers 36 and 38. Since the proper weight ratio betwen the additives in hoppers 36 and 38 and the portion 14a has now been achieved, permissive signals are given to the transport system 16 and transport systems 40 and 42 to be actuated either manually, or by a mixer cycle control to effect a dumping of the elastomer portion 14a and the contents of the hopper 36 and of the hopper 38, as desired, through a trough 56 which feeds the various compounds into the trough 12 of the mixer 10. For example, the driving of the transporters 16, 40, and 42 is automatically achieved by driving the transporter or conveyor actuators, or motors 16a, 40a and 42a by power leads extending from the determinator 26. Each transporter 40 and 42 is driven sufficiently to bring the next bin 36a and 38a into position, as any suitable number of the bins may be provided. The transporter 16 drive also serves to bring the next quantity of elastomer over to the scale 22.

FIG. 2 is a schematic of the determinator means 26 which is utilized to effect the automatic determination of the proper weight ratios between the elastomer 14a and the powder and liquid additives. Primarily, the determinator, or master control 26 comprises a plurality of individual interlocked control circuits for the individual transport actuators in the apparatus of the invention. Thus, FIG. 2 shows that the lead 24 extends into the determinator 26 and that a plurality of individual control circuits, one of which will be specifically described and only two of which are shown, are provided for the individual additives. Thus, a lead 68 connects from the lead 24 to a suitable multiplier or amplifier member, such as a solid state member or circuit, or the like indicated by the numeral 70. This member also has an input from a lead 72 that connects to a suitable potentiometer 74, or the like. The potentiometer 74 normally would have a control knob, or other control member associated therewith whereby such control knob could be set manually, or the adjustment of the potentiometer 74 may be motor controlled and be automatically regulated by control switches, or punched card or tape control systems, in a predetermined manner dependent upon the proportionate amount of the additive controlled by this circuit to be used in this particular batch or mix in relation to the rubber or elastomer, and dependent upon the specific amount of elastomeric material present. Hence, the multiplier 70 provides an output through a lead 76 to a suitable subtractor unit 78, normally a solid state member or circuit, which also has an input applied thereto by the lead 48. When the signal supplied by the lead 48 is in proper relation to the signal provided by the lead 76, this shows a proper amount of the dry additive ready for the mix and then the subtractor 78 will have no output through its lead 80. Such lead 80 connects to a suitable controller 82 which is shown in a diagrammatic form. The controller 82 is so arranged and designed that it will provide certain actuating, permissive and/or control functions when a zero input is provided to it by the lead 80 and a lead 69 from the mixer provides a signal that the mixer is ready for a new batch, as hereinafter explained. This controller 82 has a plurality of relays (not shown) provided therein, or in other suitable positions, which relays are interconnected with corresponding relays provided in the other controllers for the other additive control circuits in the apparatus and control means provided. Thus, when operative conditions are indicated, in all controllers, the interlocked relays would all be actuated and the individual controllers can each provide an output signal. The controller 82 is designed to provide an output signal through the lead 60, which connects to the motor 42a for energizing such motor, or sending it a permissive signal so that such actuator can, when otherwise energized, feed the dry additive material on its associated transporter 42 over for deposit into the mixer 10. Preliminary to actuation of the transporter, however, the controller 82 also provides an output signal through the lead 52 which actuates the electric control valve 32 to terminate flow of additive to the transporter 40 when a zero input is received from the lead 80. Similar control circuits are provided for each of the additive means and weighing stations provided in the apparatus. It is noted, however, that a second controller 84 has output signals provided through the leads 62 and 54 whereby the lead 54 will close the valve 34 and then the transporter 42 is ready for discharge actuation by its actuator 42a.

It is yet a further control feature of the present apparatus and invention that the mixer 10 has a suitable limit switch or other type of a control member 66 provided therein which member is closed when the mixer 10 is ready for a new load of elastomeric material. By closing the switch 66, as by a discharge door 11, then an input signal is provided through the lead 69 which connects to each of the controllers 82, 84, etc., provided in the determinator 26. Such signal through the lead 69 is required in order to close one of the control relays and/or switches in the actuator circuits for each of the actuators 16a, 40a and 42a, so that none of such actuators can be energized until all are in condition for operation and the mixer 10 is prepared for receipt of a new batch of material. The circuits are so set and connected that another impulse from the switch 66 to the various additive circuits is required before they can be actuated for a second discharge action.

It will be realized that the amplifier or multiplier 70 used in the apparatus takes into account the ratio of various powders, oils or other materials in relation to the weight of rubber or other elastomeric substance weighted by the scale 22 so that the weight or mass 14a thereof being prepared for deposit into the mixer 10 has been properly taken into account and the amounts of additives to be used correlated properly thereto.

Actually, relays controlled by an output signal in the lead 60, for example, can be provided either within the controller 82 or can be separately provided in the individual output leads connecting to the actuator drives so that in all events, such circuits are interlocked and will not energize their associated transporters until all circuits are in "go" condition and the mixer is ready to receive. The actual operating signals for the transporters may be the permissive signals sent from the controllers 82, 84 or such signals may just clear the transporter drive means for actuation, as by control tapes or the like connected thereto.

It should be appreciated that the mass of elastomeric material 14a need not remain on the scale 22 while the additives are being weighed if it is desired to have another station provided for such material prior to deposit thereof into the mixer. Thus, by the use of proper memory circuits, the weight of additives can still be correlated to the weight of the elastomeric material being processed, and the elastomer could be moved to a "hold" station, if desired, for discharge to the mixer 10 when the proper amounts of additives have been provided in the buckets 36, 38, etc., or the elastomer could be deposited in the mixer for processing while the additives are being weighed.

It will be realized that conventional components and circuit connections are used for the members 70, 78 etc., and that a conventional power supply energizes the control circuits of the invention.

The determinator 26 may be replaced with other control means such as a Wheatstone bridge circuit, or by a mechanically operated potentiometer that is actuated by movement of beams built into the weighing systems, or by suitable signals from such weighing systems.

In this example, suitable power supply circuits (not shown) also connect to the scales 22, 44 and 66 to supply power signals therefrom proportional to the weights of material thereon.

In general, it will be seen that the determinator 26 takes the weight signal from the line 24 and integrates it, as a proportion, of the signal from the lead 72, or equivalents and then proper proportions of other ingredients are provided for mixture with the weighted elastomer mass.

While one complete embodiment of the invention has been disclosed herein, it will be appreciated that modification of this particular embodiment of the invention may be resorted to without departing from the scope of the invention as defined in the appended claims.

What is claimed is:

1. The combination of a mixer apparatus with apparatus for automatically measuring properly proportioned additive quantities comprising means for feeding a mass of elastomeric material into said mixer apparatus, means for weighing said mass prior to it being fed into said mixer apparatus, a plurality of individual additive supply means, a plurality of means for receiving additives individually from said supply means and for feeding the mix additives individually into said mixer, a plurality of devices for separately weighing each of the additives prior to their feed into said mixer apparatus, and control and determination means responsive to said mass weighing means to automatically stop the feeding of each of said mix additives individually after the weight of the individual additive prepared for feed into the mixer apparatus is at a proper ratio to the weight of said mass.

2. The combination according to claim 1 including means for moving a premix of elastomeric material towards the mixer, and means for separating a mass from the premix material for processing.

3. The combination according to claim 1 including separate means for conveying the mass and each selective additive to the mixer, and means for simultaneously signaling the means once the proper weight ratios have been established to permit delivering the mass and additives to the mixer when the mixer is ready for receipt thereof.

4. The combination according to claim 1 wherein means responsive to the control and determinator means stop the feeding of mix additives by actuating control valves to stop the flow of additives preparatory to their feed into the mixer apparatus.

5. The combination according to claim 1 wherein the electronic signal is fed from the mass weighing means to the control and determinator means, which signal indicates the weight of said mass.

6. A combination as in claim 1 where an electrically actuated control valve means for each of said additive feeding means is provided for control of flow of such additive, and said control and determinator means include a plurality of units each for control of the quantity of one additive material, and each comprising an amplifier means connected to receive a signal from said mass weighing means, a subtractor means receiving an input from said amplifier means and a second input from one of said weighing devices proportional to the weight of additive released, which inputs when balanced provide no output from said subtractor means, and a controller connected to said subtractor means to receive the output therefrom, and to transmit an operative impulse to the corresponding control valve means to shut-off feed of additive.

7. A combination as in claim 1 where said control and determinator means include a plurality of units each comprising an amplifier means connected to receive a signal from said mass weighing means, and a subtractor means connected to receive an input from said amplifier means and a second input from one of said additive weighing devices proportional to the weight of additive released, which inputs when balanced provide no output from said subtractor means whereby said subtractor means can be used to actuate a control device for additive feed control under predetermined conditions.

8. In combination, a mixer apparatus, means for feeding a mass of plastic material into said mixer apparatus, means for weighing said mass, means for controllably feeding mix additives into a zone for feed into said mixer, means for weighing said additives prior to their deposit in said mixer, determinator means responsive to all of said weighing means to automatically stop the feeding of any one of said mix additives into a said zone after a proper weight ratio between said mass and the said additive has been reached, and control means to effect discharge of the mass of plastic material and the said additives into said mixer at predetermined times.

9. A combination as in claim 8 where a control is associated with said mixer and is operatively connected to said control means for actuation thereof only when said mixer is ready for a new batch.

References Cited

UNITED STATES PATENTS

| | | | |
|---|---|---|---|
| 2,105,266 | 1/1938 | Rendall | 259—154 |
| 3,170,677 | 2/1965 | Phister | 259—154 |

ROBERT W. JENKINS, *Primary Examiner.*

U.S. Cl. X.R.

222—57